(No Model.)

D. L. JOHNSON.
PROCESS OF EXTERMINATING GROUND BURROWING ANIMALS.

No. 293,470.  Patented Feb. 12, 1884.

UNITED STATES PATENT OFFICE.

DANIEL L. JOHNSON, OF KALAMAZOO, MICHIGAN.

PROCESS OF EXTERMINATING GROUND-BURROWING ANIMALS.

SPECIFICATION forming part of Letters Patent No. 293,470, dated February 12, 1884.

Application filed July 24, 1883. (No model.)

*To all whom it may concern:*

Be it known that I, DANIEL L. JOHNSON, a citizen of the United States, residing at Kalamazoo, county of Kalamazoo, State of Michigan, have invented a new and useful Process of Exterminating Ground-Burrowing Animals, of which the following is a specification.

My invention consists in a method of destroying the animal in its abode and causing the burrow to be uninhabitable thereafter by means of any suitable explosive substance or compound in the form of a torpedo.

Figure 1:
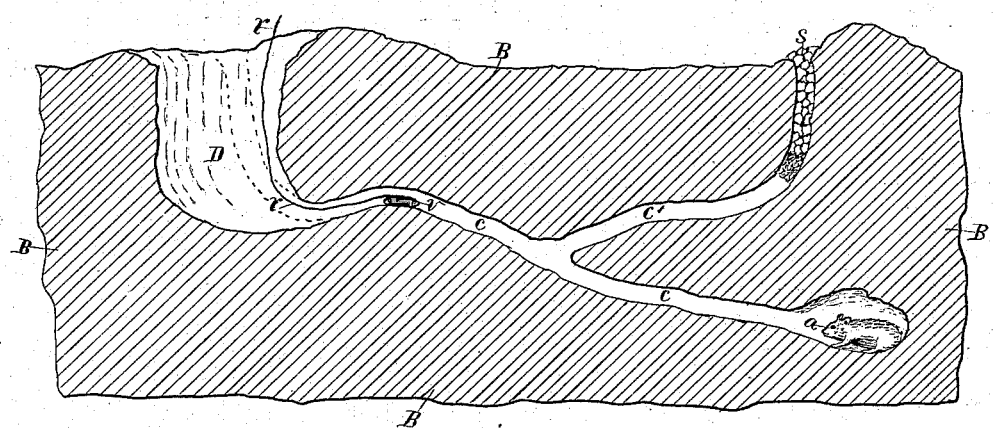
Figure 2:
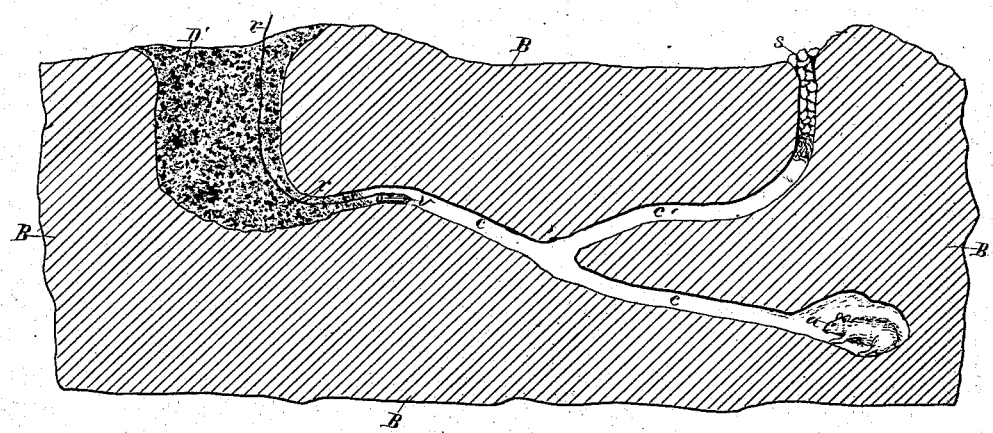

In the drawings forming a part of this specification, Figures 1 and 2 show a vertical section of the ground intercepting the burrow of a ground-hog, commonly called a "woodchuck."

This process is especially intended for exterminating the above-mentioned animals, but is equally applicable to all which burrow in substantially like manner.

The explosive used is a matter of choice. I have found herculean powder available and successful.

The burrow or hole of the ground-hog $a$ is shown at $c$, with a branch hole at $c'$. At such a time of day or upon such days as the animals are in their burrows is the proper time to operate my process. I first plug up the mouth of all the branches $c'$, as at $s$. This may be done by inserting a little grass or straw in the hole and then wedging in stone or other suitable material. I then excavate the earth for a distance of three feet (more or less) on a line with the hole, commencing at the main entrance, as at D, Fig. 1. The dotted line in this figure shows the line of the hole $c$. I then insert the torpedo $v$, with fuse $r$ attached, as far back in the burrow from the excavation D as possible, the object being to have the torpedo as near centrally located between the extremes of the burrow as possible, in order to disturb the entire abode of the animal. The fuse $r$ is carried to the surface of the earth B above the excavation and the loose earth replaced and packed in hard, as at D', Fig. 2, thus firmly closing all the exits of the burrow $c$. The operator then ignites the end of the fuse $r$ above the earth and retires to a safe distance. The effect of the explosion is such that the animals are killed, the burrow destroyed, and the disturbed earth filled with an unpleasant odor and smoke, which remains for months.

Having thus described my process, what I claim as new is—

The process of exterminating ground-burrowing animals, which consists in firmly plugging up the mouth of the branch holes to the burrow, excavating the earth at the main entrance for a suitable distance on a line with the burrow, inserting a torpedo with fuse into the burrow beyond the terminus of the excavation, carrying the fuse to the surface of the earth, refilling the excavation and firmly packing down the replaced earth, and in igniting the fuse, all substantially as set forth.

In testimony of the foregoing I have hereunto subscribed my name in the presence of two witnesses.

DANIEL L. JOHNSON.

Witnesses:
    FRANK C. GIBBS,
    ASH W. ROWLEY.